(12) United States Patent
Dalmatov et al.

(10) Patent No.: US 11,163,497 B2
(45) Date of Patent: Nov. 2, 2021

(54) LEVERAGING MULTI-CHANNEL SSD FOR APPLICATION-OPTIMIZED WORKLOAD AND RAID OPTIMIZATION

(71) Applicant: EMC IP Holding Company LLC, Hopkinton, MA (US)

(72) Inventors: Nickolay Dalmatov, St. Petersburg (RU); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/830,376

(22) Filed: Mar. 26, 2020

(65) Prior Publication Data

US 2021/0034302 A1 Feb. 4, 2021

(30) Foreign Application Priority Data

Jul. 31, 2019 (RU) .......................... RU2019124181

(51) Int. Cl.
*G06F 3/06* (2006.01)

(52) U.S. Cl.
CPC ............ *G06F 3/0664* (2013.01); *G06F 3/064* (2013.01); *G06F 3/0607* (2013.01); *G06F 3/0631* (2013.01); *G06F 3/0644* (2013.01); *G06F 3/0689* (2013.01)

(58) Field of Classification Search
CPC ...... G06F 3/0607; G06F 3/0631; G06F 3/064; G06F 3/0644; G06F 3/0664; G06F 3/0689

See application file for complete search history.

(56) References Cited

U.S. PATENT DOCUMENTS

| | | | |
|---|---|---|---|
| 2012/0089854 A1* | 4/2012 | Breakstone | G06F 3/0625 713/323 |
| 2013/0132769 A1* | 5/2013 | Kulkarni | G06F 11/2094 714/6.22 |

* cited by examiner

*Primary Examiner* — Yong J Choe
(74) *Attorney, Agent, or Firm* — Daly, Crowley, Mofford & Durkee, LLP (57) ABSTRACT

A method for use in a computing system, the method comprising: identifying plurality of storage devices; generating a plurality of virtual drive sets, each virtual drive set corresponding to a different one of the plurality of storage devices, each virtual drive set including a plurality of virtual drives, such that each of the virtual drives in the virtual drive set is mapped to a different portion of the virtual drive set's corresponding storage device; instantiating a plurality of storage drive arrays, each of the storage drive arrays being formed of virtual drives from different virtual drive sets; instantiating a plurality of logical units, each of the logical units being instantiated on a different one of the plurality of storage drive arrays; and assigning at least some of the logical units to different software components that are executed on the computing system.

17 Claims, 9 Drawing Sheets

LEVERAGING MULTI-CHANNEL SSD FOR APPLICATION-OPTIMIZED WORKLOAD AND RAID OPTIMIZATION

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, method is provided for use in a computing system, the method comprising: identifying plurality of storage devices; generating a plurality of virtual drive sets, each virtual drive set corresponding to a different one of the plurality of storage devices, each virtual drive set including a plurality of virtual drives, such that each of the virtual drives in the virtual drive set is mapped to a different portion of the virtual drive set's corresponding storage device; instantiating a plurality of storage drive arrays, each of the storage drive arrays being formed of virtual drives from different virtual drive sets; instantiating a plurality of logical units, each of the logical units being instantiated on a different one of the plurality of storage drive arrays; and assigning at least some of the logical units to different software components that are executed on the computing system.

According to aspects of the disclosure, a system is provided, comprising: a memory; and at least one processor operatively coupled to the memory, the at least one processor being configured to perform the operations of: identifying plurality of storage devices; generating a plurality of virtual drive sets, each virtual drive set corresponding to a different one of the plurality of storage devices, each virtual drive set including a plurality of virtual drives, such that each of the virtual drives in the virtual drive set is mapped to a different portion of the virtual drive set's corresponding storage device; instantiating a plurality of storage drive arrays, each of the storage drive arrays being formed of virtual drives from different virtual drive sets; instantiating a plurality of logical units, each of the logical units being instantiated on a different one of the plurality of storage drive arrays; and assigning at least some of the logical units to different software components that are executed in the system.

According to aspects of the disclosure, a non-transitory computer-readable medium is provided that stores one or more processor-executable instructions, which, when executed by at least one processor of a computing system, cause the at least one processor to perform the operations of: identifying plurality of storage devices; generating a plurality of virtual drive sets, each virtual drive set corresponding to a different one of the plurality of storage devices, each virtual drive set including a plurality of virtual drives, such that each of the virtual drives in the virtual drive set is mapped to a different portion of the virtual drive set's corresponding storage device; instantiating a plurality of storage drive arrays, each of the storage drive arrays being formed of virtual drives from different virtual drive sets; instantiating a plurality of logical units, each of the logical units being instantiated on a different one of the plurality of storage drive arrays; and assigning at least some of the logical units to different software components that are executed on the computing system.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1A:
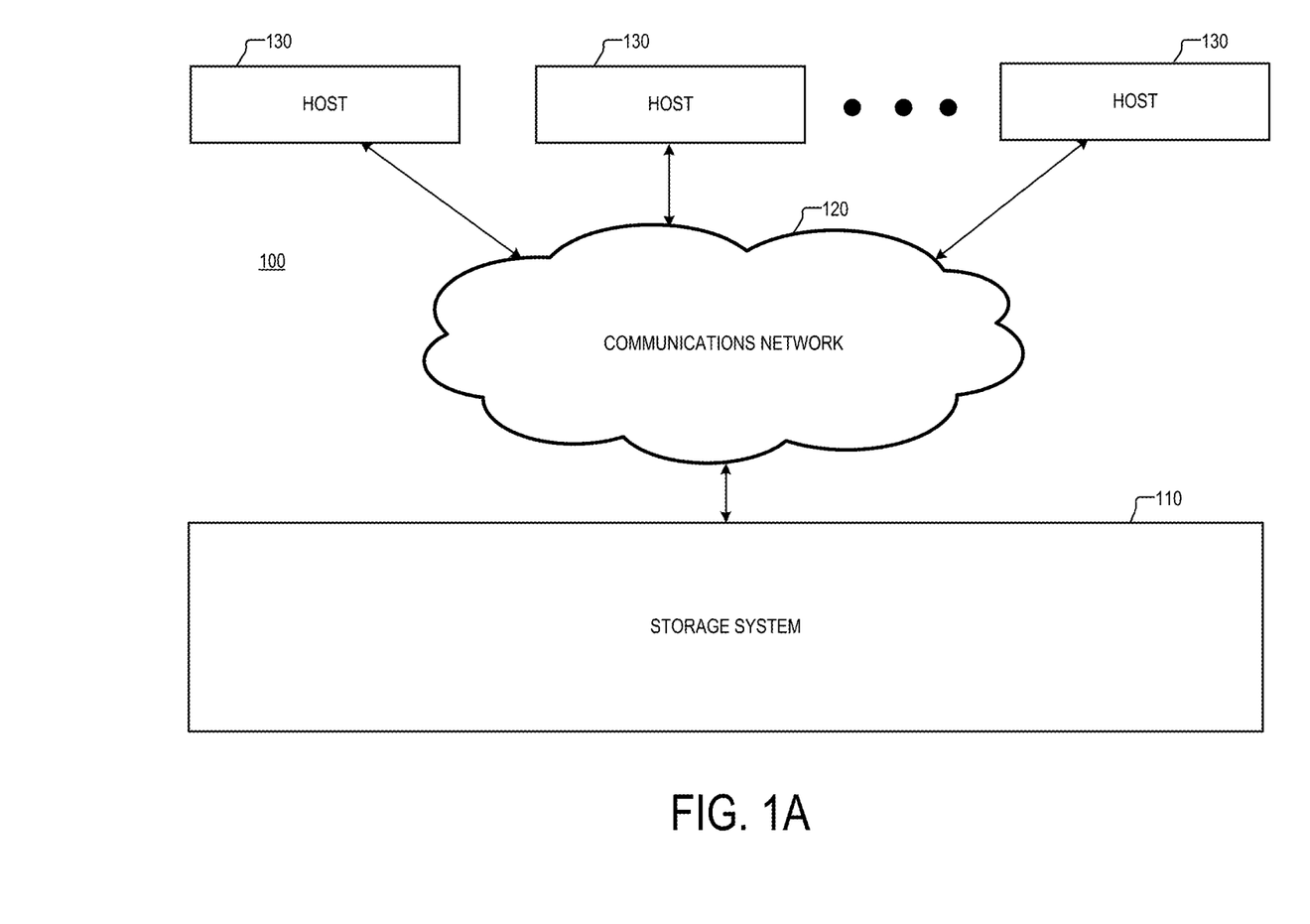
FIG. 1A is a diagram of an example of a system, according to aspects of the disclosure.

FIG. 1A is a diagram of an example of a system 100, according to aspects of the disclosure. The system 100 may include a storage system 110 that is coupled to one or more host devices 130 via a communications network 120. The storage system 110 may include a midrange storage system, an enterprise storage system, and/or any other suitable type of storage system. The communications network 120 may include a local area network (LAN), a wide area network (WAN), the Internet, and/or any or suitable type of communications network. Each of the host devices 130 may include a desktop computer, a laptop computer, a smartphone, a digital media player, and/or any other suitable type of electronic device.

Figure 1B:
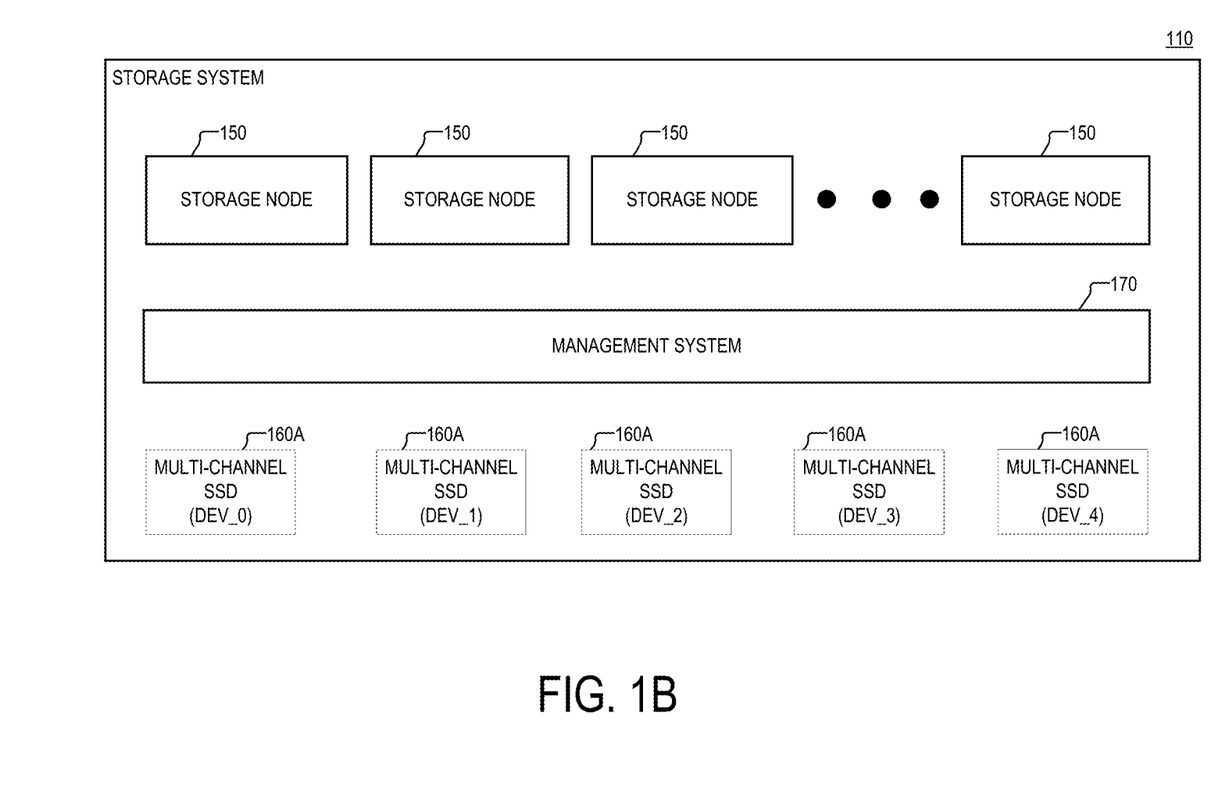
FIG. 1B is a diagram of an example of a storage system, according to aspects of the disclosure.
Figure 2A:
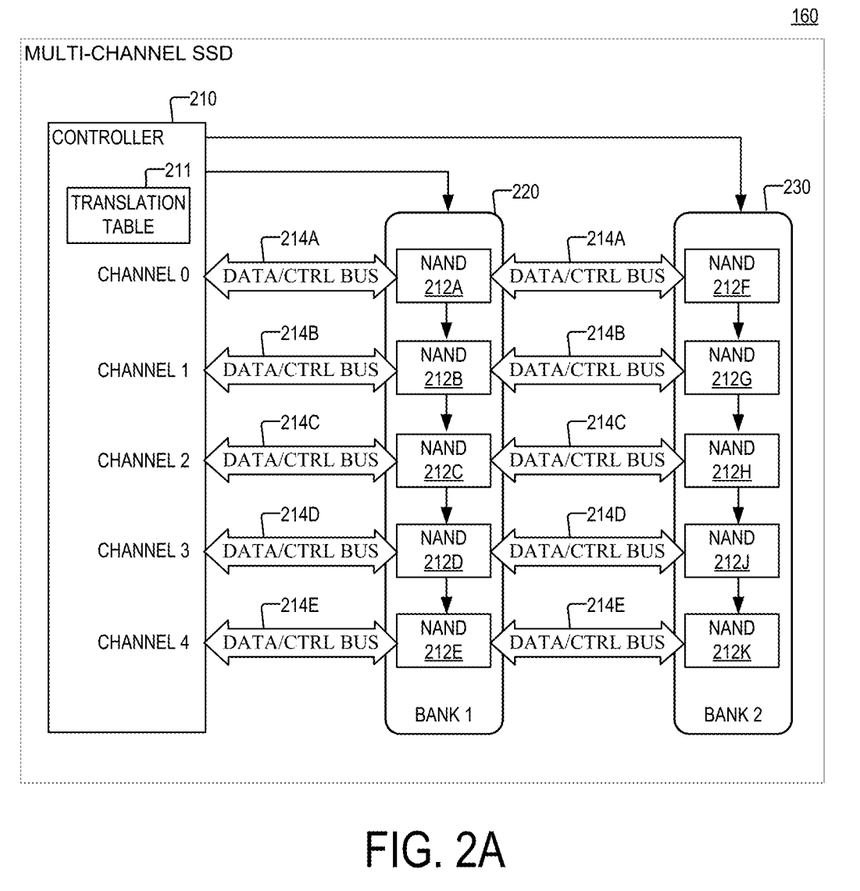
FIG. 2A is a diagram of an example of a solid-state drive, according to aspects of the disclosure.

FIG. 1B is a diagram of the storage system 110, according to aspects of the disclosure. The storage system 110 may include a plurality of storage nodes 150, a plurality of solid-state drives (SSDs) 160, and a management system 170. Each of the storage nodes 150 may include any suitable type of computing device, such as a storage server, a desktop computer, a laptop, etc. In some implementations, any of the storage nodes 150 may include the computing device 800, which is discussed further below with respect to FIG. 8. In some implementations, any of the SSDs 160 may be a multichannel drive in which each of the channels is directly addressable by software using the SSD 160 (e.g., software running one or more nodes of the storage system 110). The configuration of any of the SSDs 160 (in accordance with one particular implementation) is discussed in further detail with respect to FIG. 2. Although in the example of FIG. 1B the storage system 110 uses solid-state drives as its primary data store, it will be understood that alternative implementations are possible in which any other suitable type of storage device is used instead.

The management system 170 may include any suitable type of computing device, such as the computing device 800, which is discussed further below with respect to FIG. 8. In operation, the management system 170 may be configured to combine the SSDs 160 into a plurality of logical units (LUs), and subsequently assign each of the LUs to respective software components that are executed by the storage system. Such software components may include components that perform data backup, applications that service I/O requests and/or any other suitable type of software component. As used throughout the disclosure, the term "application" may refer to a process, a plug-in, a standalone application, a portion of a standalone application, and/or any other suitable type of software component. The operation of the management system 170 is discussed further below with respect to FIGS. 3-8.

FIG. 2A shows an example of an SSD 160, according to aspects of the disclosure. As illustrated, the SSD 160 may include a controller 210, a first NAND bank 220, and a second NAND bank 230. The controller 210 may include any suitable type of processing circuitry that is configured to service I/O requests that are received at the SSD 160 from one of the storage nodes 150. In some implementations, the controller 210 may include a general-purpose processor (e.g., an ARM-based processor), an application-specific integrated circuit (ASIC), a Field-Programmable Gate Array (FPGA) and/or any other suitable type of processing circuitry.

The first NAND bank 220 may include a plurality NAND dies 212A-E, and the second NAND bank 230 may include a plurality of NAND dies 212F-K. Each of the plurality of NAND dies 212 may include a plurality of memory cells that are directly addressable by the controller 210. More specifically, in some implementations, NAND dies 212A and 212F may be coupled to the controller 210 via a first channel 214A; NAND dies 212B and 212F may be coupled to the controller 210 via a second channel 214B; NAND dies 212C and 212H may be coupled to the controller 210 via a third channel 214C; NAND dies 212D and 212J may be coupled to the controller 210 via a fourth channel 214D; and NAND dies 212E and 212K may be coupled to the controller via a fifth channel 214E. In some implementations, NAND dies 212 that are on different channels 214 may be accessed in parallel by the controller 210. In this regard, the introduction of multiple channels can help increase the rate at which data is retrieved and stored into the NAND banks 220 and 230.

The controller 210 may implement a translation table 211, as shown. The translation table 211 may map a logical address space of the SSD 160 to the SSD's physical address space. The logical address space may include a plurality of page addresses. The physical address space may include a plurality of identifiers, wherein each identifier corresponds to a specific set of memory cells that form the physical medium on which a page of data is stored. The translation table 211 may thus map each of the addresses in the logical address space of the SSD 160 to respective identifier(s) that correspond to a specific set of memory cells (that form a page). As used throughout the disclosure, the term "logical address space of an SSD" may refer to the address space that is exposed by the SSD to a motherboard or a processor and/or software that is running on the motherboard or processor. As is well known in the art, such address space may be distinguished from other (higher-order) logical address spaces in a system, such as a volume address space or an LU address spaces.

In some implementations, data may be written to the SSD 160 in units known as "pages." However, at the hardware level, memory cells in the SSD 160 may be modified in larger units, known as "memory blocks," which are made of multiple pages. Moreover, data that is once stored in a memory block cannot be modified any further because of physical and electrical limitations that are inherent in flash memory. Rather, when data stored in a memory block (hereinafter "original memory block") needs to be modified, this data is: (i) retrieved from the original memory block, (ii) stored in volatile memory, (iii) modified while it is stored in volatile memory, and (iv) copied from volatile memory into another memory block of the SSD 160. After the modified data is stored in the other memory block, the original memory block is erased and reused. Moreover, after the modified data is stored in the other memory block, the translation table may be updated to identify the other memory block as the physical medium for logical addresses that were previously associated with the original memory block.

This cycle of erasing and copying data to new memory blocks, when a page in the logical address space of the SSD 160 needs to be updated, can be at least partially transparent to software and/or hardware that uses the SSD 160. As a result, both short-lived data and long-lived data may be stored in the same memory block. According to the present example, short-lived data may be data that is updated frequently. And long-lived data may be data that is updated hardly ever. Thus, when the short-lived data in a memory block is updated, the long-lived data that is stored on the same memory block also needs to be erased and copied to a new memory block, even though no changes are being made to the long-lived data. This cycle of unnecessary copying and erasing of data can increase the wear on the SSD 160 and is sometimes referred to as write-amplification.

According to the present example, the SSD 160 can be an open-channel SSD and/or any other type of SSD that is arranged to allow the addressing of specific channels 214 within the SSD 160. In this regard, when software writes data to the SSD 160, the software may issue a write request that includes an identifier corresponding to a specific channel 214 (and/or a subset of all available channels 214) that is to be used for the servicing of the write request. Upon receiving such a request, the controller may select a physical address on one of the NAND dies 212 that are located on the specified channel(s), and write data associated with the request to one or more memory blocks that are located in the selected NAND dies. For instance, when the controller 210 receives a write request selecting channel 214A, the controller 210 may write data associated with the request to memory block(s) in NAND dies 212A and 212F only. Similarly, when the controller 210 receives a write request selecting channel 214B, the controller 210 may write data associated with the request only to memory blocks in NAND dies 212B and 212G. In other words, by selecting a particular channel for the servicing of write and read requests, software running on the storage system 110 may effectively exclude all NAND dies 212 that are not connected to the selected channel, thereby restricting the controller 210 to using only a portion of the memory blocks that are available in the SSD 160.

Although FIG. 2A shows the SSD 160 as including 5 channels, it will be understood that alternative implementations are possible in which the SSD 160 includes any number of channels (e.g., 7, 10, etc.). Although in the example of FIG. 2A, the SSD 160 includes two NAND banks, it will be understood that alternative implementations are possible in which the SSD includes any number of memory banks. Furthermore, although in the present example, the SSD 160 is formed of NAND devices, it will be understood that the present disclosure is not limited to any specific type of non-volatile memory technology.

Figure 2B:
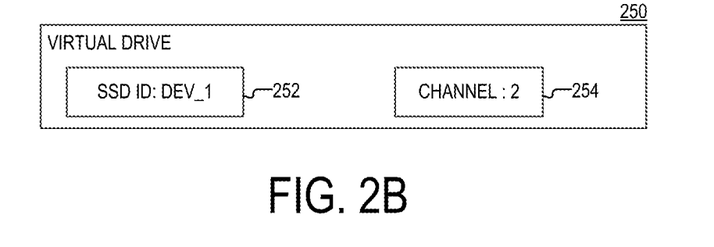
FIG. 2B is a diagram of an example of a virtual drive, according to aspects of the disclosure.
Figure 3:
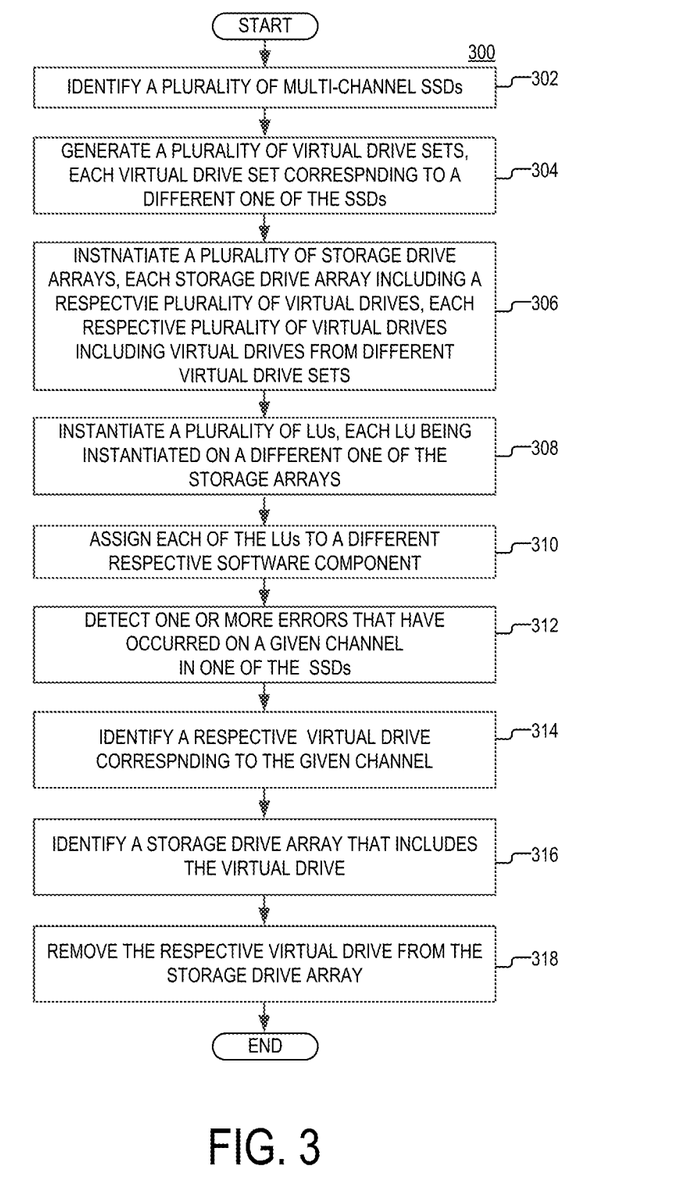
FIG. 3 is a flowchart of an example of a process, according to aspects of the disclosure.

FIG. 2B is a diagram of an example of a virtual drive 250 that can be used for accessing a portion of the SSD 160, according to aspects of the disclosure. According to the present example, the virtual drive 250 includes a device identifier 252 and a channel identifier 254. The device identifier 252 may identify one of the SSDs 160 in the storage system 110, and the channel identifier 254 may identify a specific channel 214 in the SSD corresponding to the device identifier 252. In some implementations, the virtual drive 250 may be an interface (e.g., a software interface) between the SSD (specified by device identifier 252) and one or more software components that are executed in the storage system 110. Additionally or alternatively, in some implementations, the virtual drive 250 may be implemented as a logical block device object and/or any other suitable type of object that appears as a memory device to software components in the storage system 110. Additionally or alternatively, in some implementations, the virtual drive 250 may be limited to accessing only locations (specified by device identifier 252) in the SSD 160 that are reachable via the channel specified by channel identifier 254. In such implementations, the virtual drive 250 may be incapable of being used to reach locations in the given SSD 160 that are reachable by channels other than the channel specified by channel identifier 254. According to the present example, the virtual device 250 is implemented as a virtual block device object. However, it will be understood that the present disclosure is not limited to any specific implementation of the virtual device FIG. 3 is a flowchart of an example of a process 300 that can be used to reduce write amplification the storage system 110. According to the present, the process 300 is performed by the management system 170. However, alternative implementations are possible in which the process 300 as executed by any of the storage nodes 150 and/or another computing device that is part of (or otherwise associated with) the storage system 110.

At step 302, the management system 170 detects that a plurality of SSDs 160 are available in the storage system 110.

Figure 4:
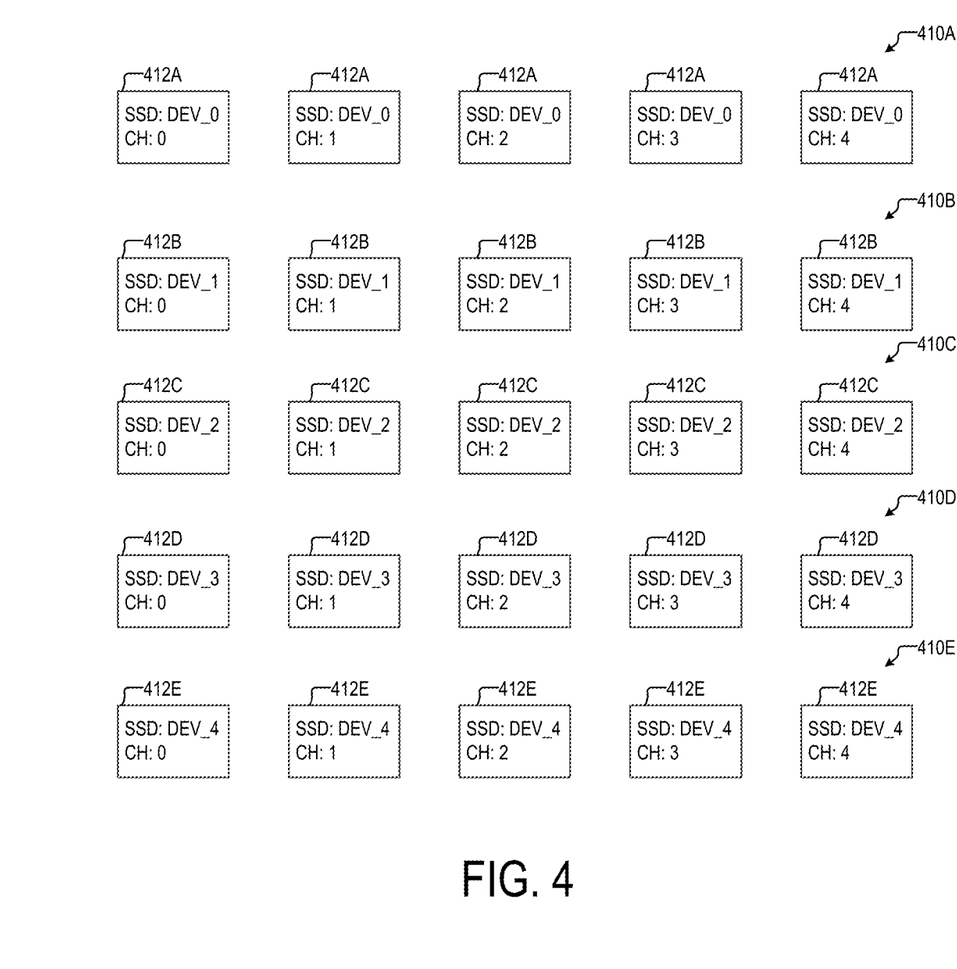
FIG. 4 is a diagram of an example of a plurality of virtual drive sets, according to aspects of the disclosure.

At step 304, the management system 170 generates a plurality of virtual drive sets 410. As illustrated in FIG. 4, each of the virtual drive sets 410 may be associated with a different one of the SSDs 160, and it may include a plurality of virtual drives 412. Moreover, each of the virtual drives 412 in any of the virtual drive sets 410 may be associated with a different channel of the set's corresponding drive. More particularly, the virtual drive set 410A may be associated with the SSD 160A, and it may include a plurality of virtual drives 412A. Each of the virtual drives 412A may be associated with a different one of the channels 214 in the SSD 160A. The virtual drive set 410B may be associated with the SSD 160B, and it may include a plurality of virtual drives 412B. Each of the virtual drives 412B may be associated with a different one of the channels 214 in the SSD 160B. The virtual drive set 410C may be associated with the SSD 160C, and it may include a plurality of virtual drives 412C. Each of the virtual drives 412C may be associated with a different one of the channels 214 in the SSD 160C. The virtual drive set 410D may be associated with the SSD 160D, and it may include a plurality of virtual drives 412D. Each of the virtual drives 412D may be associated with a different one of the channels 214 in the SSD 160D. The virtual drive set 410E may be associated with the SSD 160E, and it may include a plurality of virtual drives 412E. Each of the virtual drives 412E may be associated with a different one of the channels 214 in the SSD 160E.

Figure 5:
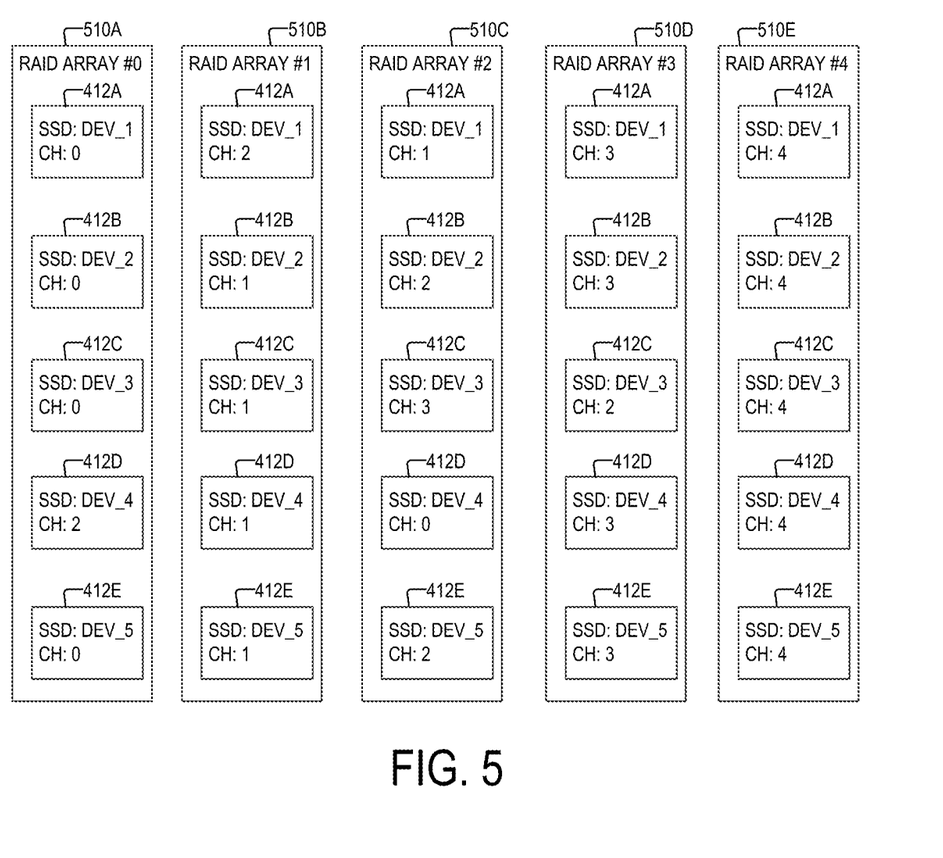
FIG. 5 is a diagram of an example of a plurality of storage drive arrays, according to aspects of the disclosure.

At step 306, the management system 170 generates a plurality of storage drive arrays 510 by using the virtual drive sets 410. As illustrated in FIG. 5, each of the storage drive arrays 510 may include a RAID array (e.g., a RAID group). Furthermore, each of the storage drive arrays 510 may include a respective virtual drive from each of the virtual drive sets 410. For example, the storage drive array 510A may include one virtual drive 412A, one virtual drive 412B, one virtual drive 412C, one virtual drive 412D, and one virtual drive 412E. The storage drive array 510B may include one virtual drive 412A, one virtual drive 412B, one virtual drive 412C, one virtual drive 412D, and one virtual drive 412E. The storage drive array 510C may include one virtual drive 412A, one virtual drive 412B, one virtual drive 412C, one virtual drive 412D, and one virtual drive 412E. The storage drive array 510D may include one virtual drive 412A, one virtual drive 412B, one virtual drive 412C, one virtual drive 412D, and one virtual drive 412E. And the storage drive array 510E may include one virtual drive 412A, one virtual drive 412B, one virtual drive 412C, one virtual drive 412D, and one virtual drive 412E. Although in the present example RAID is used to group multiple virtual drives into a signal storage unit, it will be understood that the present disclosure is not limited to any specific technology for grouping storage devices.

At step 308, the management system 170 instantiates a plurality of logical units (LUs) 610. As illustrated FIG. 6, each of the logical units 610 may be instantiated on a different one of the storage drive arrays 510. In particular, LU 610A may be instantiated on a storage drive array 510A; LU 610B may be instantiated on storage drive array 510B; LU 610C may be instantiated on a storage drive array 510C; LU 610D may be instantiated on storage drive array 510D; and LU 610E may be instantiated on storage drive array 510E.

Figure 6:
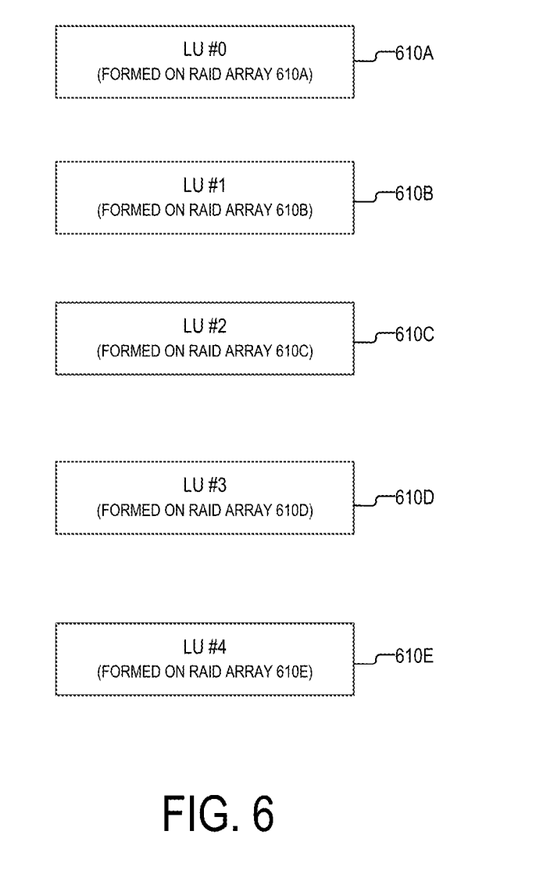
FIG. 6 is a diagram of an example of a plurality of logical units, according to aspects of the disclosure.

At step 310, the management system 170 assigns a different application to at least some of the LUs 610. For example, in some implementations, the management system 170 may assign a first application to the LU 610A and a second application to the LU 610B. In some implementations, the first application may include an application that generates long-lived data, and the second application may be one that generates short-lived data. In some respects, assigning the first second and second applications to different LU may prevent long-lived data and short lived-data from being stored in the same memory blocks, which in turn could reduce the amount write amplification that occurs with the SSDs 160.

At step 312, the management system 170 detects that one or more errors have occurred on a given channel in one of the SSDs 160 (e.g., channel 1 in SSD 160B). In some implementations, the management system 170 may detect the errors in response to error messages generated by the controller of the SSD. In some implementations, each of the error messages may include an error code identifying a type of error and a channel identifier corresponding to the given channel. At step 314, the management system 170 identifies a virtual drive 410 corresponding to the channel (i.e., a virtual drive that is used to write and read from the channel). At step 316, the management system 170 identifies a storage drive array that includes the virtual drive identified at step 314. And at step 318, the management system 170 removes the virtual drive from the storage drive array identified at step 316. In some implementations, the removal may be performed in the same way one would remove a failed non-virtual drive from a failed storage drive array (e.g., a RAID 4 array).

Although in the example of FIG. 3, each of the virtual drives 412 corresponds to a respective channel of an SSD, alternative implementations are possible in which any of the virtual drives 412 corresponds to one or more channels of another type of storage device. In this regard, it will be understood that process 300 is not limited to using SSD only. Although in the example of FIG. 3, the process 300 is performed by the management system 170, alternative implementations are possible in which process 300 is performed by any other computing device that is part of (or otherwise associated with) a storage system.

In some implementations, when assigning virtual drives 412 to different storage drive arrays, the management system 170 may take into account the wear that is present the memory blocks located on the virtual drive's channel. As a result, in some implementations, the virtual drives 412 in at least one of the storage drive arrays may have matching wear. As used throughout the disclosure, the phrase "wear on a virtual drive" refers to the wear that is present on the NAND dies 212 that are associated with the virtual drive's corresponding channel 214.

For example, in some implementations, the virtual drives 412 may be grouped based on their relative wear. In such implementations, the management system may determine the wear on the virtual drives 412 in each virtual drive set 410. Next, the management system 170 may identify the virtual drives 412 that have the highest wear in each of the virtual drive sets 410, and group those virtual drives in storage drive array 510A. Next, the management system 170 may identify the virtual drives 412 that have the second highest wear in each of the virtual drive sets 410, and group those virtual drives in storage drive array 510B. Next, the management system 170 may identify the virtual drives 412 that have the third highest wear in each of the virtual drive sets 410, and group those virtual drives in storage drive array 510C. Next, the management system 170 may identify the virtual drives 412 that have the fourth highest wear in each of the virtual drive sets 410, and group those virtual drives in storage drive array 510D. Next, the management system 170 may identify the virtual drives 412 that have the least wear in each of the virtual drive sets 410, and group those virtual drives in storage drive array 510C.

As another example, in some implementations, the virtual drive may be grouped in terms of their absolute wear. Absolute wear of a NAND die may be measured in terms of a number of writes performed on the die, remaining useful life, and/or any other suitable metric. In some the virtual drives 412 may be grouped in the storage drive arrays 510 in a way minimizes the difference in wear, in each storage drive array 510, between the virtual drive 412 with the most wear in the storage drive array 510 and the virtual drive 410 with the least wear in the same storage drive array 510.

In some implementations, software may be assigned to different LUs 610, based on: (i) the longevity of data generated by the software, and (ii) the wear that is present on the virtual drives 412 (and/or storage drive arrays 510) that are used to implement the LUs 610. In such implementations, a software component that generates long-lived data (e.g., an application that generates backup copies of a data entity) may be assigned to a LU 610 that has comparatively high wear, whereas a software component that generates short-lived data (e.g., an online transactional processing system) may be assigned to an LU 610 that has a comparatively low wear.

In some respects, assigning software components that generate long-lived data to LUs 610 that have high wear may help prolong the useful life of such LUs. As discussed above, long-lived data generates fewer memory block updates, and causes less wear than short-lived data. Furthermore, in some respects, assigning software components that generate long-lived data to virtual dives that have high wear and assigning software components that generate short-lived data to virtual drives that have low wear may help level out the wear that is present in different portions of any given one of the SSDs 160 (that are used to implement the virtual drives). Moreover, as can be readily appreciated, taking into account the wear on different SSD channels (which are used to implement the virtual drives) may facilitate a more fine-grained approach towards wear-balancing, than when the wear on an entire SSD 160 is viewed as a whole.

Figure 7:
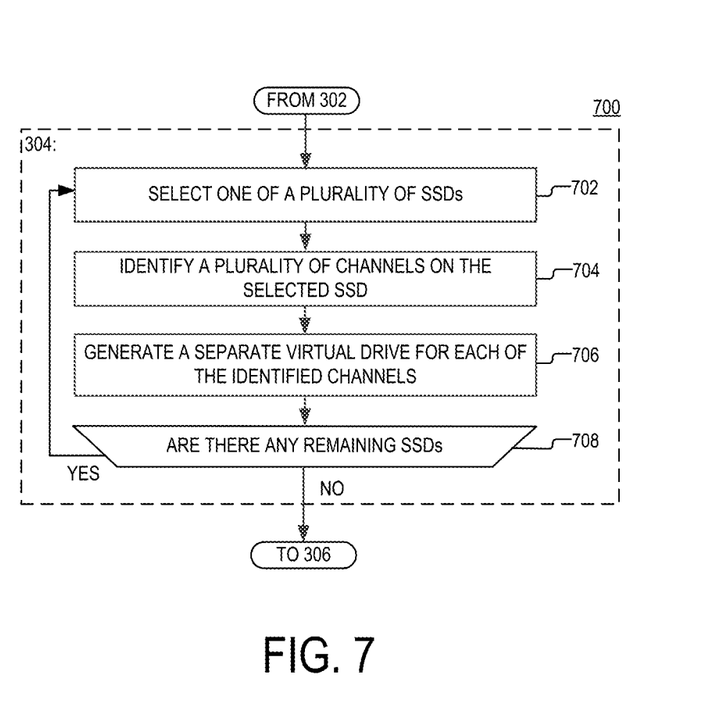
FIG. 7 is a flowchart of an example of a process, according to aspects of the disclosure.

FIG. 7 is a flowchart of an example of a process 700 for generating a plurality of virtual drive sets as specified by step 304 of the process 300. At step 702, the management system 170 selects one of the SSDs 160. At step 704, the management system 170 identifies a plurality of channels that are available on the SSD. In some implementations, the management system 170 may identify the plurality of channels by transmitting a query to the controller 210 of the selected SSD 160 and receiving, from the controller 210, a list of channel identifiers in response to the query. At step 706, the management system 170 generates a virtual drive set 410 for the selected SSD 160. As discussed above, the set 410 may include a plurality of virtual drives 412, wherein each of the virtual drives 412 is associated with a different channel in the selected SSD 160. As discussed above, in some implementations, each of the virtual drives 412 may be used exclusively for addressing NAND dies 212 that are located on that virtual drive's channel and it may not be useable for accessing NAND dies 212 that are located on other channels. Additionally or alternatively, each of the generated virtual drives 412 may have the same or similar configuration as the virtual drive 250, which is discussed above with respect to FIG. 2. At step 708, the management system 170 whether there are any SSDs 160 that remain to be processed. If there are more SSDs 160 that remain to be processed, the process 700 returns to step 702 and steps 702-706 are repeated for another one of the SSDs. Otherwise, if there are no more SSDs 160 that remain to be processed, the process 700 ends.

Figure 8:
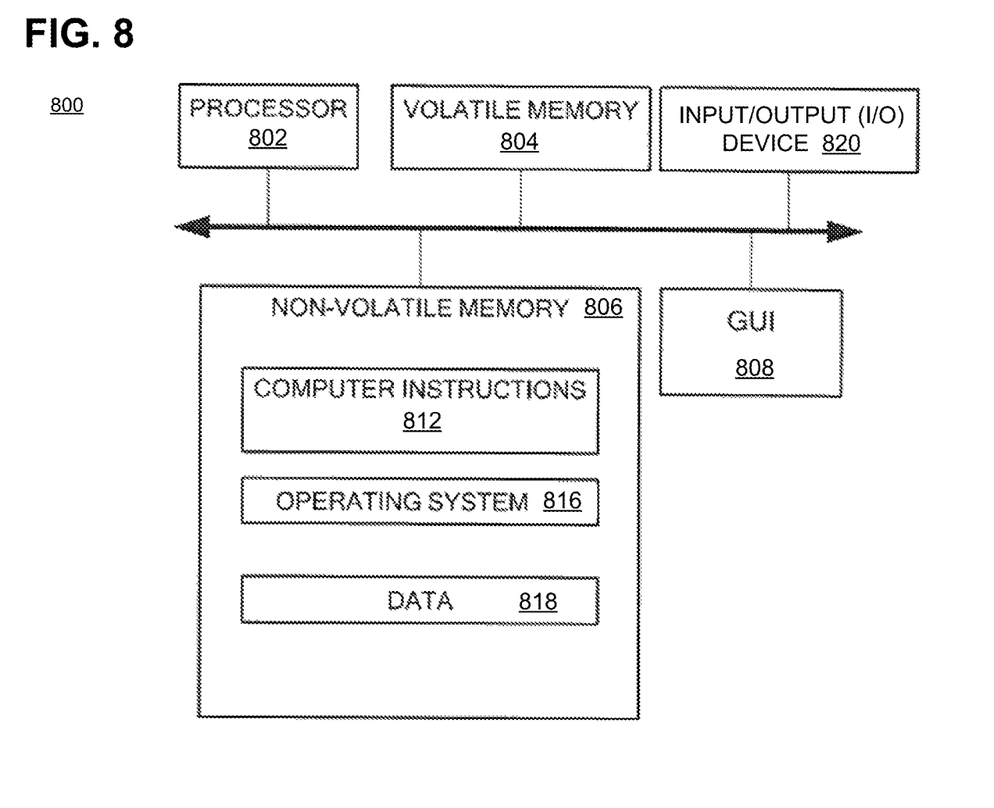
FIG. 8 is a diagram of an example of a computing device, according to aspects of the disclosure.

Referring to FIG. 8, in some implementations, any of the storage nodes 150 and/or the management system 170 may be implemented as one or more computing devices 800.

Each computing device 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the process 700 and/or any other function of the storage system 110.

FIGS. 1-8 are provided as an example only. At least some of the steps discussed with respect to FIGS. 1-8 may be performed in parallel, in a different order, or altogether omitted. Although in the present example, each virtual drive 410 is associated with a single SSD channel, alternative implementations are possible in which any of the virtual drives 412 is associated with multiple channels. In such implementations, virtual drives 412 that are associated with multiple channels be limited to accessing only locations in the SSD 160 (specified by device identifier 252) that are reachable via the associated channels. Although the examples presented with respect to FIGS. 1A-8 are presented in the context of solid-state drives, it will be understood that the present disclosure is not limited to any specific type of multi-channel storage devices.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a computing system, the method comprising:
    identifying plurality of storage devices;
    generating a plurality of virtual drive sets, each virtual drive set corresponding to a different one of the plurality of storage devices, each virtual drive set including a plurality of virtual drives, such that each of the virtual drives in the virtual drive set is mapped to a different portion of the virtual drive set's corresponding storage device;
    instantiating a plurality of storage drive arrays, each of the storage drive arrays being formed of virtual drives from different virtual drive sets;
    instantiating a plurality of logical units, each of the logical units being instantiated on a different one of the plurality of storage drive arrays; and
    assigning at least some of the logical units to different software components that are executed on the computing system,
    wherein any of the virtual drives includes a device identifier and a channel identifier, the device identifier identifying a given one of the plurality of storage devices, and the channel identifier identifying a channel in the given storage device that is assigned to the virtual drive.

2. The method of claim 1, wherein each of the storage devices includes a multi-channel storage device, and the virtual drives in any of the virtual drive sets are mapped to different channels of the virtual drive set's corresponding storage device.

3. The method of claim 1, wherein the storage drive array includes a Redundant Array of Independent Disks (RAID) array.

4. The method of claim 1, wherein generating any of the plurality of virtual drive sets includes selecting one of the plurality of storage devices, identifying a plurality of channels in the selected storage device, instantiating a plurality of virtual drives, and assigning each of the identified channels to a different one of the instantiated virtual drives.

5. The method of claim 1, wherein any of the virtual drives is configured to implement an interface for storing data in a set of memory blocks that is associated with the virtual drive's respective channel.

6. The method of claim 1, wherein any of the virtual drives includes a virtual block device object.

7. A system, comprising:
    a memory; and
    at least one processor operatively coupled to the memory, the at least one processor being configured to perform the operations of:
    identifying plurality of storage devices;
    generating a plurality of virtual drive sets, each virtual drive set corresponding to a different one of the plurality of storage devices, each virtual drive set including a plurality of virtual drives, such that each of the virtual drives in the virtual drive set is mapped to a different portion of the virtual drive set's corresponding storage device;
    instantiating a plurality of storage drive arrays, each of the storage drive arrays being formed of virtual drives from different virtual drive sets;
    instantiating a plurality of logical units, each of the logical units being instantiated on a different one of the plurality of storage drive arrays; and
    assigning at least some of the logical units to different software components that are executed in the system,
    wherein any of the virtual drives includes a device identifier and a channel identifier, the device identifier identifying a given one of the plurality of storage devices, and the channel identifier identifying a channel in the given storage device that is assigned to the virtual drive.

8. The system of claim 7, wherein each of the storage devices includes a multi-channel storage device, and the virtual drives in any of the virtual drive sets are mapped to different channels of the virtual drive set's corresponding storage device.

9. The system of claim 7, wherein the storage drive array includes a Redundant Array of Independent Disks (RAID) array.

10. The system of claim 7, wherein generating any of the plurality of virtual drive sets includes selecting one of the plurality of storage devices, identifying a plurality of channels in the selected storage device, instantiating a plurality of virtual drives, and assigning each of the identified channels to a different one of the instantiated virtual drives.

11. The system of claim 7, wherein any of the virtual drives is configured to implement an interface for storing data in a set of memory blocks that is associated with the virtual drive's respective channel.

12. The system of claim 7, wherein any of the virtual drives includes a virtual block device object.

13. A non-transitory computer-readable medium storing one or more processor-executable instructions, which, when executed by at least one processor of a computing system, cause the at least one processor to perform the operations of:
    identifying plurality of storage devices;
    generating a plurality of virtual drive sets, each virtual drive set corresponding to a different one of the plurality of storage devices, each virtual drive set including a plurality of virtual drives, such that each of the virtual drives in the virtual drive set is mapped to a different portion of the virtual drive set's corresponding storage device;
    instantiating a plurality of storage drive arrays, each of the storage drive arrays being formed of virtual drives from different virtual drive sets;
    instantiating a plurality of logical units, each of the logical units being instantiated on a different one of the plurality of storage drive arrays; and
    assigning at least some of the logical units to different software components that are executed on the computing system,
    wherein any of the virtual drives includes a device identifier and a channel identifier, the device identifier identifying a given one of the plurality of storage devices, and the channel identifier identifying a channel in the given storage device that is assigned to the virtual drive.

14. The non-transitory computer-readable medium of claim 13, wherein each of the storage devices includes a multi-channel storage device, and the virtual drives in any of the virtual drive sets are mapped to different channels of the virtual drive set's corresponding storage device.

15. The non-transitory computer-readable medium of claim 13, wherein the storage drive array includes a Redundant Array of Independent Disks (RAID) array.

16. The non-transitory computer-readable medium of claim 13, wherein generating any of the plurality of virtual drive sets includes selecting one of the plurality of storage devices, identifying a plurality of channels in the selected storage device, instantiating a plurality of virtual drives, and assigning each of the identified channels to a different one of the instantiated virtual drives.

17. The non-transitory computer-readable medium of claim 13, wherein any of the virtual drives is configured to implement an interface for storing data in a set of memory blocks that is associated with the virtual drive's respective channel.

* * * * *